W. A. KIRBY.

Harvester.

No. 1,211. Reissued July 9, 1861.

N. PETERS. Photo-Lithographer, Washington, D. C.

UNITED STATES PATENT OFFICE.

WILLIAM A. KIRBY, OF BUFFALO, AND DAVID M. OSBORNE, OF AUBURN, NEW YORK, ASSIGNEES OF SAID KIRBY.

IMPROVEMENT IN HARVESTERS.

Specification forming part of Letters Patent No. 26,114, dated November 15, 1859; Reissue No. 1,211, dated July 9, 1861.

*To all whom it may concern:*

Be it known that WILLIAM A. KIRBY, of Buffalo, in the county of Erie and State of New York, did invent certain new and useful Improvements in Grain and Grass Harvesters; and we do hereby declare that the following is a full, clear, and exact description of the same, reference being had to the accompanying drawings, making a part of this specification, in which—

Figure 1:
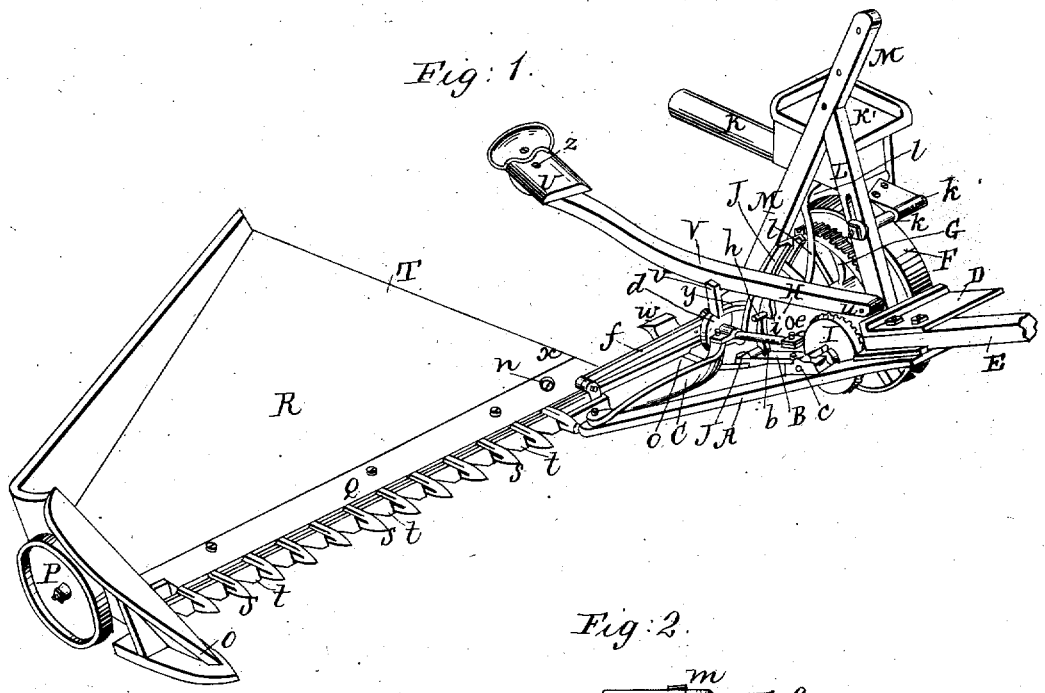
Figure 2:
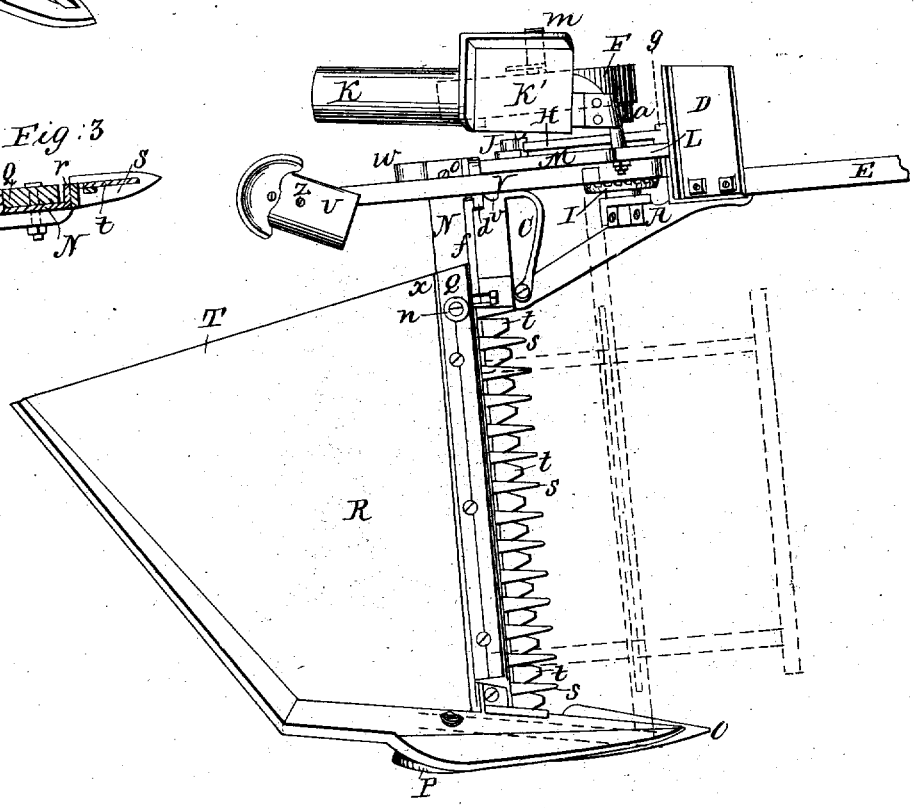
Figure 3:
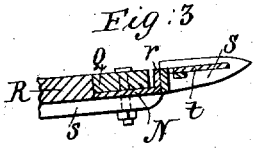

Figure 1 represents a perspective view of the machine with the reel and outer reel-post omitted. Fig. 2 represents a top plan with the reel and outer reel-post shown in red lines. Fig. 3 represents a section taken through one of the fingers and its bar, the cutter and its bar, and a portion of the platform and its bar.

Similar letters of reference, where they occur in the several figures, denote like parts of the machine in all of them.

The duty of a raker upon a grain-harvesting machine being a laborious one, it is important that he should be in such position as to enable him to discharge these duties as effectually and with as little labor as possible. He may be at times compelled to reach with his rake into the grain that is about to be cut, to raise it up or disentangle it. He often must clear the outside divider of the cut grain that is apt to lodge and hang upon it, and he must at all times keep the platform swept clean as fast as sufficient s raw has accumulated to form a gavel, and this gavel must be deposited upon the ground in good shape for binding, and out of the return path or swath of the machine. To find a location upon or in connection with a grain-harvesting machine that will enable the rader to discharge these duties with ease to himself was the purpose and object of WILLIAM A. KIRBY'S invention; and to this end, without impairing any of the other operating parts of the machine, he devised the hereinafter-described construction and operation of parts to accomplish the desired purpose.

The nature of the invention of the said WILLIAM A. KIRBY consists in combining with a cutting apparatus and a platform having a side delivery, both placed in rear of a line drawn through the front of the main wheel, the raker's seat located at the side of the platform, and arranged so that the raker sits behind the main frame and facing the falling grain, from which location he can, with great ease to himself, watch the operation of the cutting apparatus, rake off the grain from the platform, and deliver the gavels in good shape for binding upon the ground.

From the above statement of the purpose, object, and nature of the said KIRBY'S invention it will be perceived that there are several restrictions attaching thereto, but requiring the aggregate of the whole to accomplish the purpose aimed at.

In the first place, the cutting apparatus and platform must be placed in rear of a line drawn through the front of the main wheel, so as to bring the cut grain as near to the place of delivery as possible, which is in rear of the main frame. If the raker had to reach clear forward to the front of the machine or main frame and draw the gavel to the rear of it, it would increase his labor beyond his physical endurance, and hence the cutting-apparatus and platform must be in the rear of that line; and as an auxiliary to the platform placed as above described, it must have a side delivery, so that the gavel can be easily delivered therefrom in good shape for binding, and in a position that will not interfere with the next or return swath of the machine.

In the next place, the raker's seat must be located behind a line drawn through the cutting apparatus, so that he may, when it becomes necessary, reach into the grain about to be cut or that just cut to raise it up, disentangle it, or deliver the gavel onto the ground in a good and convenient position. If the raker were placed in or too near the line of the cutters, he could not, because of the reel, reach to the outside divider to draw the hanging grain from it, and hence the location of the seat behind the cutting apparatus, as above stated.

Again, the raker's seat must be at the side of the platform, so that an easy and short movement of his rake may draw the grain to its point of delivery. If he were on the platform, his weight would add much to the side draft of the machine, which of itself is a sufficient objection to placing him there; but he could not at any point on the platform rake off the grain without a greater sweep of his rake, arms, and body than when at the side of it, and hence the location of the seat at the side of the platform, as above stated.

Again, the raker's seat is located in rear of the main frame because the gavels are delivered at that point, and his position there, while it does not interfere with any of his other duties, enables him to deliver the gavels in good shape for being bound, and out of the path of the machine on its next round. And, lastly, the raker's seat is located so that the raker may sit upon it facing the falling grain. This enables him to see when the grain is entangled or about to become so, and raise it up or draw it off from the outside divider, and in every respect work with more ease and comfort to himself than when he sits with his back to the horses.

To enable others skilled in the art to make and use this invention, we proceed to describe the same with reference to the drawings.

The general characteristics of this machine are the same as those embraced in the patent granted to William A. Kirby on the 2d of September, 1856, and reissued 15th March, 1859. Its more specific construction may be described as follows:

A B represent two sides of a metallic frame, which may be cast in one piece, and C a tie-piece near their rear ends, which forms a triangular frame, said tie-piece being curved or inclined upward, so as to pass over and not entangle or drag the cut grain or grass. To the front part of this frame is fastened the foot-board D for the driver, as also the tongue E.

F is the driving-wheel, as also the main supporting-wheel, and is placed outside of the frame A B C, or so that the outside of the frame, should it for any purpose be carried around said wheel, need not be supported on the wheel on that side. The wheel F carries a cogged rim, G, which drives a pinion, *a*, on a shaft, *c*, which is supported in suitable boxes on the two pieces A B of the frame. On this same shaft, *c*, is hung a plate, H, to which the journal or axle *e* of the main wheel F is firmly attached, so that said plate and wheel may move on said shaft *c* as a center, which allows the cogged rim G to roll on the pinion *a* without running out of gear with it, said pinion having also the shaft *c* for its center. On the inner end of the shaft *c* there is a bevel-gear, I, which takes into a bevel-pinion on the shaft *b*, and gives said shaft *b* its motion; and on the rear end of this shaft *b* there is a crank-wheel, *d*, to which the pitman *f*, that drives the cutter, is attached.

A curved rim, J, is firmly connected to the frame B, and has a flanged way or groove in it through which the perimeter of the plate H traverses, to keep it steady, the front portion of said plate being also steadied or guided in its traverse by a similar contrivance, (seen at *g*, Fig. 2.) There are a series of holes in the plate H, through either of which an adjusting-pin, *h*, is placed, and when the projection *i* on the rim comes in contact with said pin it defines the extent of motion of the frame on the wheel in a downward direction.

K is the driver's seat when the machine is used for mowing grass, and K′ his seat or location when the machine is used for reaping grain, the driver being moved forward when the raker is on to better balance the machine. The driver's seat, or the piece to which his seat is attached, is hinged to a stud or arm, *k*, that is adjusted and made fast in the post L, and is further supported by a rod or bent bar, *l*, extending up to its under side from the journal or axle *e* on each side of the main wheel F. When the driver sits at K′, his feet are on the foot-board D; but when he sits at K his left foot is placed on the brace or stirrup *m* on the outside of the wheel F, said stirrup being connected to the bar *l* or to the axle *e*, or to some other piece or part in that locality.

It will be perceived that the driver's seat is slightly skewed with regard to the main frame, its rear being farther from the platform than its front portion. This arrangement not only better balances the machine, but allows him to sit more facing toward the reel, to watch obstructions there, while it does not prevent him from watching his team.

To the rim J there is firmly bolted a reel-post, M, said reel-post projecting forward from its point of attachment, and the post L is framed into said reel-post, and thus serves as a brace to support it. The outside reel post is shown in red lines in Fig. 2, but is omitted in Fig. 1. It is fastened to the outside shoe or divider, and also inclines forward so as to afford with the post M proper supports for the reel, which is also shown in red lines in Fig. 2.

N is the finger-bar, which is fastened to the main frame at the points *n o*, which are behind a line drawn through the front of the main wheel F. This finger-bar is formed of a piece of flat iron with a flange, *r*, Fig. 3, turned up upon it, which gives it strength and allows the fingers *s* to be attached thereto by horizontal bolts or rivets, and forms a recess for the platform or platform-bar to lie in.

*t* are the cutters, and *o* the outside divider, with an outer supporting-wheel, P, said wheel and divider being removed at times and a shoe of a special kind substituted for them; but as said shoe will form the subject-matter of another application for a patent it is not more particularly referred to here.

T is the delivery side of the platform. It forms with the finger-bar an angle of about eighty degrees, leaving a widened space in rear of the frame, or an obtuse angle, in which or over which is located the raker's seat U, as follows: V is a beam, which may, for convenience, be slightly curved, as shown. It is pivoted to the post L at *u*, and thence extending rearward is supported at *v* by an iron, which I call a "stirrup-iron," that is fastened to the rim J, and to the extreme rear portion of this beam is secured the raker's seat U, as shown in the drawings, it occupying the position there shown in the angle formed by the receding of the side T of the platform. The raker in this seat braces himself by placing his left foot against the brace *w* and his right foot against the platform at about the point *x* thereon, and in this position he faces toward the reel, which enables him to rake in tangled grain, as above mentioned, or to clear the platform of the cut grain, which is his main duty when the grain is being reeled in, and with great ease comparatively, he having the free use of his arms and upper part of his body, which is free from a bracing or support of any kind, and from this position it requires but a gentle sweep of the rake or of his body or arms to draw the cut straw to edge T of the platform, where the heads are caught by the stubble, and the machine passes out from under the gavel, leaving it in a compact form for binding.

When the driver sits at K, his left foot, as heretofore mentioned, is in the outer stirrup *m*, and his right foot in the stirrup *y*, which, together with the fact of his setting astride of his seat, gives him a great degree of firmness in his seat. This also may be said of the raker, who is similarly braced in his seat. These things may not be deemed important by those who have not seen the danger of the riders on the machine being thrown forward and into the line of the cutters. To leave the machine with all its requisites, and yet to dispense with all superfluous parts or weight, requires much labor and thought. That the seat U may be properly fixed to suit the best position of the raker, as regards facility in working his rake, it may be secured to its beam by a single screw-bolt, *z*, so that it may be turned on its beam to suit the occupant.

It will be seen that by the peculiar location of the raker's seat at the side of the platform, and the manner of hanging said seat the raker can deliver the gavel at any portion of the side of the platform most convenient to himself, and enabling him to change his point of delivery, and thus much relieve himself by changing the sweep of his body and arms in his laborious task. It also enables the raker to more readily seize with his rake the cut grain, whatever may be its position on the platform, for when the grain leans on the ground or is entangled it will, when cut, fall sometimes in one position upon the platform, and at other times in different positions; but in all or any of its positions, with this location of seat and the facility for delivering the cut grain, the raker, with comparative ease to himself, accomplishes his work.

Having thus fully described its objects and purposes, what is claimed as the invention of the said WILLIAM A. KIBBY is—

In combination with a cutting apparatus and a platform having a side delivery, and both placed in rear of a line drawn through the front of the main wheel, the raker's seat located at the side of the platform, and arranged so that the raker sits behind the main frame and facing the falling grain, substantially as and for the purpose herein described.

WM. A. KIRBY.
DAVID M. OSBORNE.

Witnesses:
CHAS. H. GARLOCK,
JNO. H. OSBORNE.